United States Patent [19]

Murata et al.

[11] 4,125,897

[45] Nov. 14, 1978

[54] HIGH SPEED PULSE INTERPOLATOR

[75] Inventors: Kazuo Murata; Terukazu Kito, both of Tokyo, Japan

[73] Assignee: Oki Electric Industry Co., Ltd., Japan

[21] Appl. No.: 795,644

[22] Filed: May 10, 1977

[51] Int. Cl.² .................................................. G06J 1/02
[52] U.S. Cl. .................................. 364/702; 318/603; 364/474
[58] Field of Search .................. 235/150.31, 152, 156, 235/151.11; 318/573, 603; 364/474, 702

[56] References Cited

U.S. PATENT DOCUMENTS

| | | | |
|---|---|---|---|
| 3,598,974 | 8/1971 | Lincoln | 235/150.31 |
| 3,679,879 | 7/1972 | Seki et al. | 235/150.31 |
| 3,701,890 | 10/1972 | Dummermuth | 235/150.31 |
| 3,911,258 | 10/1975 | Kishi et al. | 235/151.11 |
| 3,934,130 | 1/1976 | Friberg | 235/150.31 |

*Primary Examiner*—Joseph F. Ruggiero
*Attorney, Agent, or Firm*—Frailey & Ratner

[57] ABSTRACT

A D.D.A. (Digital Differential Analyzer) for pulse interpolation having a memory counter with more than two bit positions for counting the number ($m$) of input instruction pulses in each interpolation cycle, a second counter for receiving the content of the memory counter, and an auxiliary adder for obtaining $m$ multiple of the content of the integrand register in the D.D.A. system. The output of the auxiliary adder instead of the output of the integrand register is applied to an interpolation adder. Thus, the pulse interpolator can operate correctly even when more than two input instruction pulses are generated within a single interpolation cycle.

5 Claims, 16 Drawing Figures

HIGH SPEED PULSE INTERPOLATOR

BACKGROUND OF THE INVENTION

The present invention relates to a pulse interpolator, which can correctly operate even when more than two input instruction pulses are applied within a single interpolation cycle.

Pulse interpolators are utilized in, for instance, numerical control (N.C.) systems, graph plotters, and/or machines for automatic drawing.

A prior pulse interpolator operated on the principle of D.D.A. (Digital Differential Analyzer), which has a first or integrand register (IR), a second or reminder register (RR), and an adder. Every time an input instruction pulse is applied to the D.D.A. system the content of the register (RR) and the content of the register (IR) are added in said adder, and the sum is stored in the register (RR) again. If the register (RR) overflows in the addition, the overflow pulse operates as an interpolation pulse. Therefore, a prior D.D.A. system has the disadvantage that it operates incorrectly if the duration between each input instruction pulses is shorter than the time required for each interpolation calculation (addition). In that case, an input instruction pulse will be lost and an interpolation pulse to be generated by the lost input instruction pulse will also be lost. The duration between each input instruction pulses is not uniform but changes. Particularly in the case of a screw cutting N.C.

A digital element of higher speed operation would solve the above problem, but high speed digital elements are very expensive. Further, if the duration between each input instruction pulses is designed long, the accuracy of the product of the N.C. would be poor.

SUMMARY OF THE INVENTION

It is an object, therefore, of the present invention to over come the disadvantages and limitations of prior pulse interpolators by providing a new and improved pulse interpolator.

The above and other objects are attained by a high speed pulse interpolator having a first register (IR) having a predetermined value, a second register (RR) storing a temporary value, an interpolation adder for obtaining the sum of the contents of said first register (IR) and an output of an auxiliary adder, the sum of the addition by said interpolation adder being applied to said second register (RR) and the carry of the addition producing an output interpolation pulse, a memory counter having more than two bit positions for counting a number of input instruction pulses in each interpolation cycle, a second counter for receiving the content of said memory counter, an auxiliary adder for obtaining m multiple of the content of said first register (IR) where m is a value in said second counter.

BRIEF DESCRIPTION OF THE DRAWINGS

The foregoing and other objects, features, and attendant advantages of the invention will be appreciated as the same become better understood by means of the following description and accompanying drawings wherein;

FIG. 3 (*a*) through (*h*) show the timing pulse and the content of registers;

FIG. 5 (*a*) through (*c*) shows the timing pulse and the output pulse of a pulse encoder;

DESCRIPTION OF THE PREFERRED EMBODIMENTS

Figure 1:
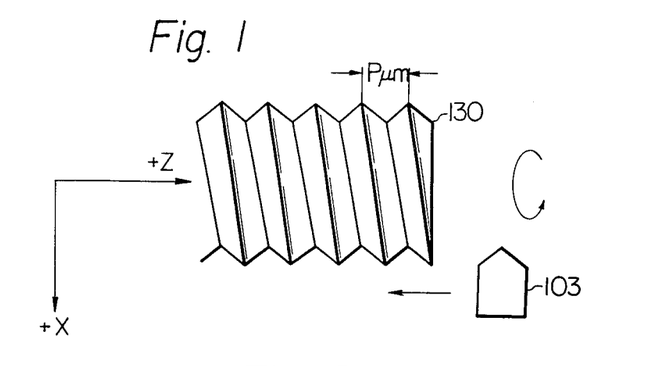
FIG. 1 is the explanatory view for the interpolation of a screw cutting N.C.

First, the background of the embodiments will be explained with reference to FIG. 1, which is an explanatory view of a screw cutting N.C.

It is supposed that each interpolation pulse moves the bit 103 of the screw cutter by 1 $\mu$m, the pitch length of a screw is P $\mu$m, and the pulse encoder connected to a spindle generates n instruction pulses for each revolution of the spindle. Then, the bit 103 must move P $\mu$m for each revolution of the work 130 connected to the spindle. Each of the instruction pulses generated by the revolution of the spindle triggers the interpolation calculation. That is to say, every time an instruction pulse is generated, a value P which is the pitch length of a screw and is stored in the integrand register (IR) is added to the content to the register (RR). If the sum of said addition exceeds n, then an interpolation pulse is generated for moving the bit 103, and the reminder or fraction of the sum less than n is stored in said register (RR) for the next interpolation calculation. In the above operation, when n instruction pulses are generated P interpolation pulses are generated. That is to say, the bit 103 moves by P $\mu$m, for each revolution of the spindle, and thus the screw cutting is performed.

In the explanation below, it is supposed that the number of instruction pulses is 2048 for each revolution of a spindle for the sake or simplicity.

Next, the prior interpolator is explained to facilitate understanding the present invention.

Figure 2:
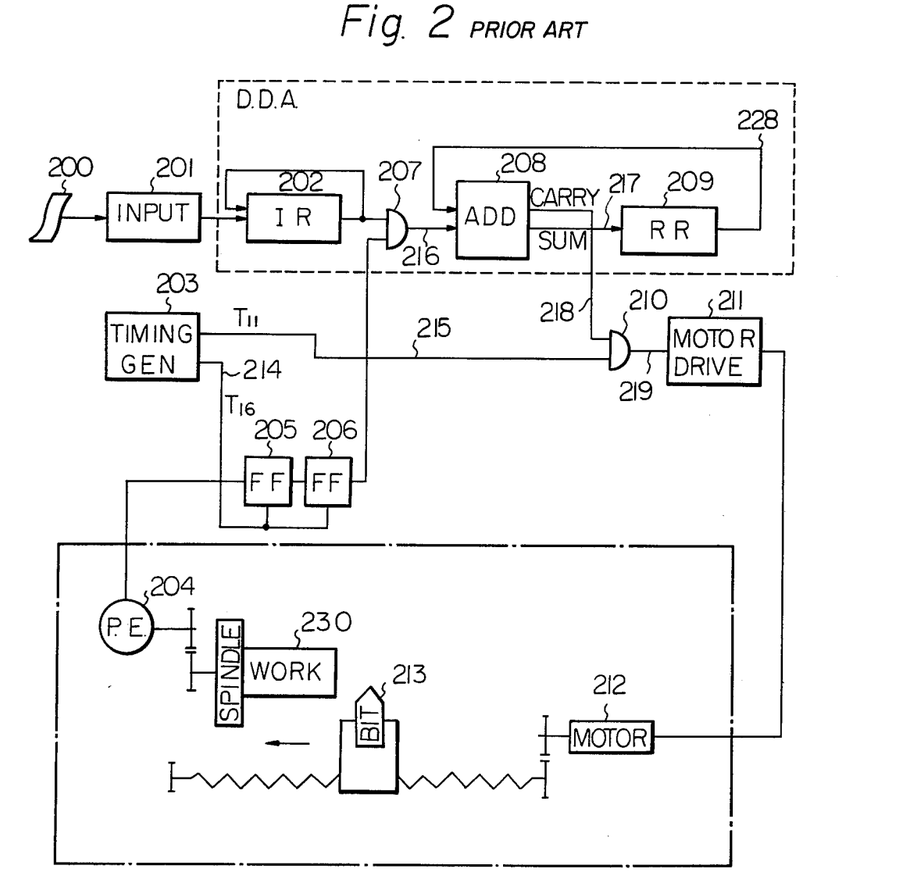
FIG. 2 is a block diagram of the prior interpolator for screw cutting.

FIG. 2 shows the prior pulse interpolator for screw cutting. In FIG. 2, the portion encircled by dotted line is the main body of D.D.A., and the content of the instruction tape 200 is read by the input circuit 201, which converts the input decimal information to a binary form. 202 is a first register for storing the pitch information of a screw, and is called "Integrand Register (IR)," and is usually in the form of a circulating shift register. The register 202 stores the pitch information of a screw from the input circuit 201 until the next instruction is applied to the same from the input circuit 201.

Figure 3:
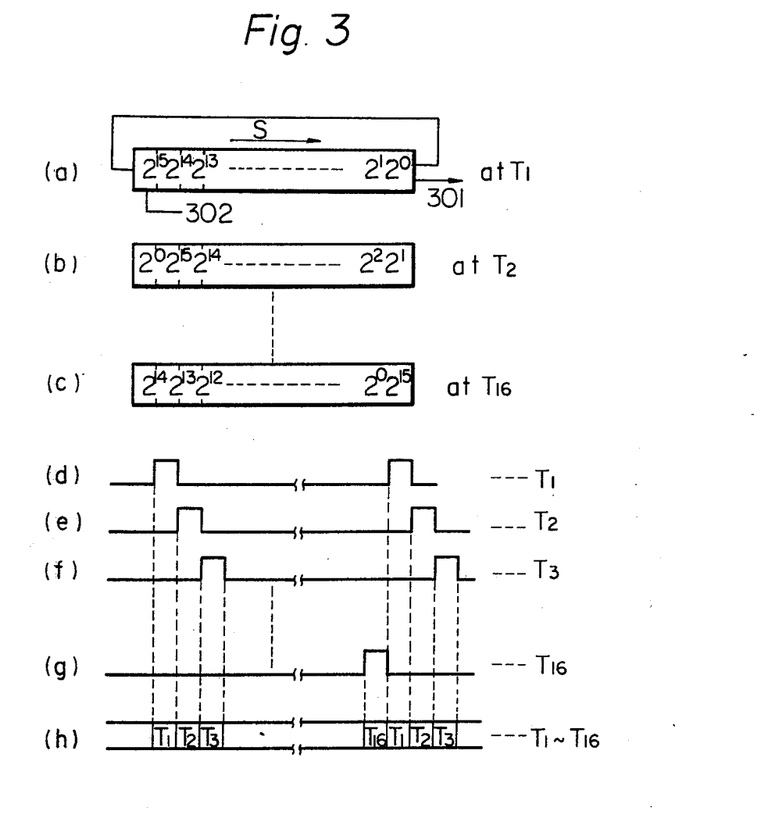

The structure of the register 202 and the other register called the remainder register (RR) 209 which will be described later, is in the form of a serial shift register with sixteen bits as shown in FIGS. 3(*a*) through 3(*c*). The contents of those two registers are continuously shifted to the right with a predetermined clock signal, and the bit at the right-most position enters the left-most position by the shift operation, so the weight in each bit position changes from $2^0$ to $2^{15}$. The clock signals $T_1$, $T_2$, $T_3$, —, $T_{16}$ are defined so that $T_1$ shows the time that the weight $2^0$ appears at terminal 301 at the right-most position of the register, $T_2$ shows that the weight $2^1$ is just at the right-most position, and so forth, and finally at timing $T_{16}$ the weight $2^{15}$ appears at the terminal 301 of the right-most position. The timing $T_1$ appears again after $T_{16}$.

Those timing signals are generated by the timing signal generator 203, which also provides $T_{11}$ at the output line 215, and $T_{16}$ at the output line 214. $T_{16}$ shows the timing that the weight $2^{15}$ appears at the output terminal of (IR)202 or (RR)209, and $T_{11}$ shows the timing that the sum from the adder 208 (described later) exceeds the value 2048. The reference numeral 205 is a flip-flop for storing pulse signals temporarily from the pulse encoder 204, which generates 2048 pulses in every revolution. The content of the flip-flop 205 is transferred to the other flip-flop 206 when the timing signal $T_{16}$ is supplied from the timing signal generator 203, and then the content of the flip-flop 205 is cleared. The flip-flop 206 stores the information from the flip-flop 205 until the next cycle of $T_{16}$ and provides the output signal to the AND circuit 207 as an adding instruction. That is to say, the flip-flop 206 provides the gate signal to the AND circuit 207 during the whole cycle from $T_1$ to $T_{16}$.

The adding instruction which is held from $T_1$ to $T_{16}$ in the flip-flop 206 opens the AND circuit 207, thus the content of the (IR)202 including the weight from $2^0$ to $2^{15}$ is applied to one input of the interpolation adder 208. The other input of the interpolation adder 208 receives the output of the second register (RR)209 through the output line 228, thus the content of the (IR)202 and the content of the register (RR)209 are added in the adder 208, and the sum is applied to the register (RR)209 through the output line 217, and the carry generated in that addition is applied to the AND circuit 210 through the carry line 218. The sum applied to the register (RR)209 refreshes the content of the same. If the output of the flip-flop 206 is zero the AND circuit 207 is closed and thus the content of the register (RR)209 is applied to the same again through the adder 208.

The AND circuit 210 receives the output line 215 which gives a positive pulse at $T_{11}$ from the timing signal generator 203, and the carry line 218 from the adder 208. The signal $T_{11}$ shows the weight $2^{10}(=1024)$ and the presence of the carry at that timing shows that the sum in the adder 208 exceeds $2^{11}(=2048)$. That is to say, if the adder 208 provides a carry or an overflow to the carry line 218 at the timing $T_{11}$, the carry pulse is applied to the motor drive circuit 211 through the AND circuit 210. According to the number of pulses applied to the motor drive circuit 211 the motor 212 is controlled to move the bit 213 thus the screw cutting is performed.

It should be appreciated of course that a carry from the adder 208 is returned to the input of the same to be added in the next figure although the circuit for that is not shown for the sake of simplicity.

However, the prior interpolator in FIG. 2 has the disadvantage that if more than two pulses are applied to the flip-flop 205 from the pulse encoder 204 during a shingle operational cycle from $T_1$ to $T_{16}$, all pulses except the first one can not be received by the flip-flop 205 and are lost, since it takes a full cycle to complete the addition. The above situation occurs when the revolutional speed of the spindle is higher than the operational speed of the electronic circuit, or the former is irregular. The loss of a pulse from the pulse encoder 204 interferes with the correct operation of the interpolator.

Figure 4:
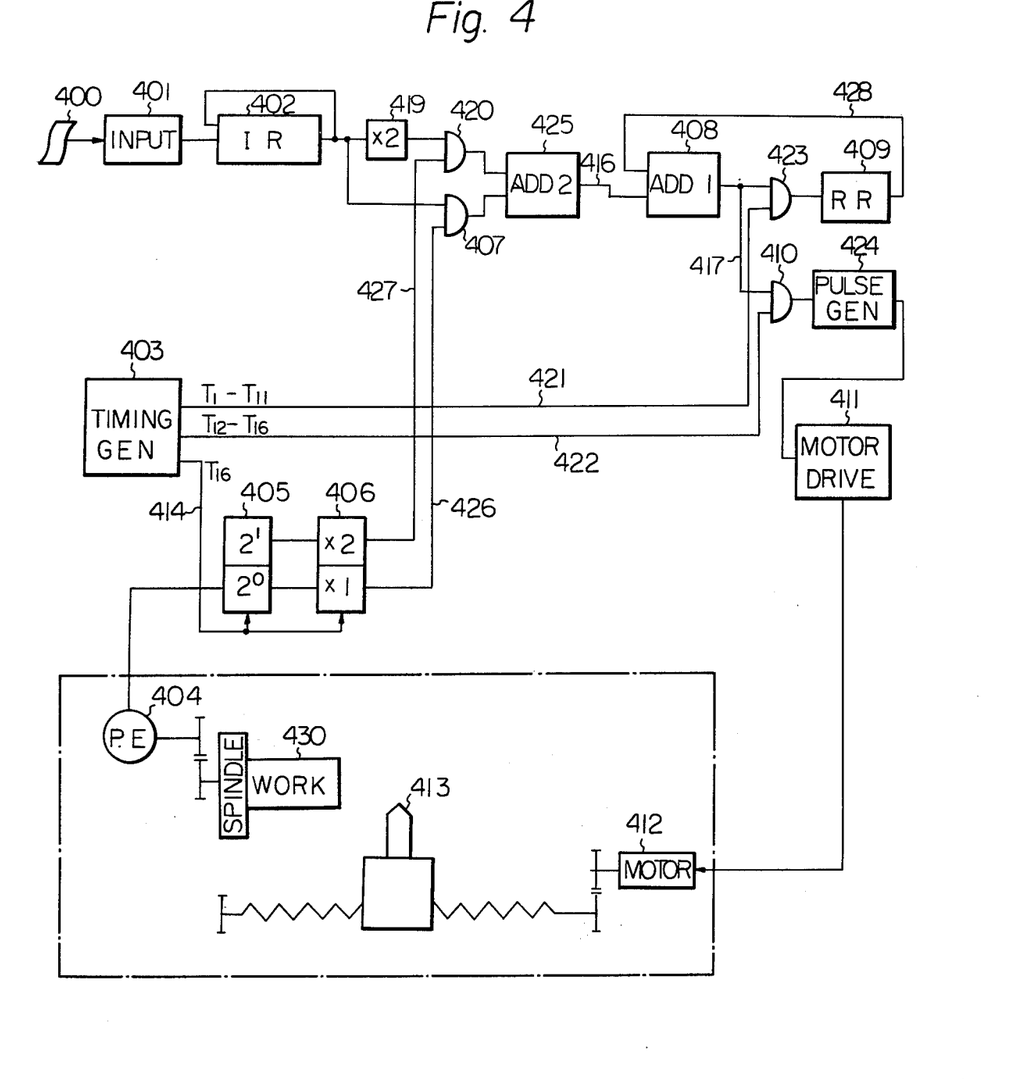
FIG. 4 is a block diagram of the present pulse interpolator.

FIG. 4 shows the blockdiagram of one embodiment of the pulse interpolator according to the present invention.

In the figure, the reference numeral 400 provides the information concerning the pitch length of a screw to the first register (Integrand Register; IR) 402 through the input circuit 401 as does the circuit of FIG. 2. The structure and the function of the register 402, and the reminder register (RR)409 are the same as those of registers 202 and 209, respectively, and those registers are shift registers having 16 bit positions the content of which is circulating. The timing signal and the content of the registers in each timing are the same as those shown in FIG. 3.

Figure 5:
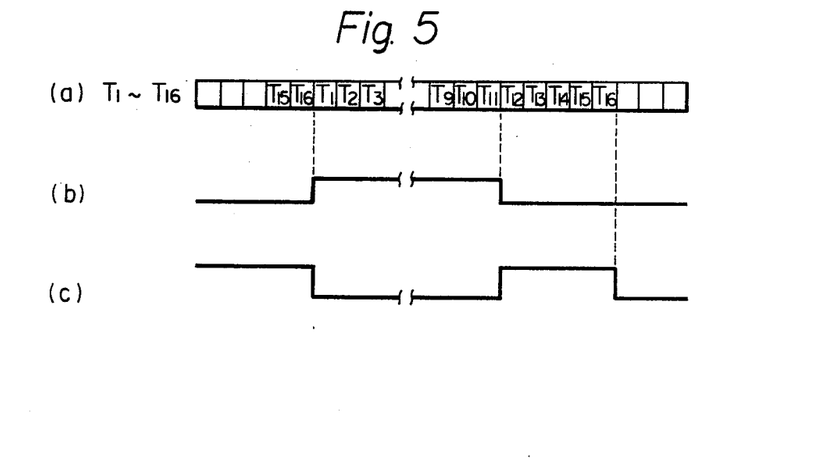

The timing signal generator 403 generates the timing signals $T_1$ through $T_{16}$, and also the first signal which includes $T_1$ through $T_{11}$ on the output line 421, the second signal which includes $T_{12}$ through $T_{16}$ on the output line 422, and $T_{16}$ on the output line 414. FIG. 5(b) shows the waveform of the first signal, and FIG. 5(c) shows the waveform of the second signal.

The pulse encoder 404 applies a train of pulses to the memory counter 405 according to the revolutional angle of the spindle. The content of the counter 405 is added by one for each pulse from the pulse encoder 404, and the content of said counter 405 is transferred to the second counter 406 at the timing $T_{16}$. The counter 405 is cleared to zero just when the same is transferred to the second counter 406. The memory counter 405 has two bit positions and thus can store three pulses from the pulse encoder 404. When the pulse from the pulse encoder 404 is applied to the memory counter 405 at the timing $T_{16}$, only the second bit position $2^1$ of the memory counter 405 is cleared to zero, but the first bit position $2^0$ of the same is set to one.

The bit position (x1) of the second counter 406 is applied to the AND circuit 407 through the output line 426, and the bit position (x2) of the same is applied to the AND circuit 420 through the output line 427. It should be appreciated that the presence of the first bit position (x1) of the counter 406 indicates that a single pulse or three pulses are applied to the counter 405 during the operational cycle $T_1$ through $T_{16}$, while the presence of the second bit position (x2) of the counter 406 indicates that two or three pulses are applied to the counter 405 during the operational cycle $T_1$ through $T_{16}$. That is to say, the content of the counter 406 indicates the number of the pulses applied to the counter 405 from the pulse encoder 404 during the last operational cycle $T_1$ through $T_{16}$. The reference numeral 419 is a one bit delay circuit connected to the output of the (IR) register 402. It should be appreciated that the output of the delay circuit 419 is the same as the content of the (IR) register 402 which was shifted in the left direction by one bit, and thus the output of the delay circuit 419 is the same as twice the present content of the (IR) register 402. The output of the (IR) register 402 is applied to the AND circuit 407, and the output of the delay circuit 419 is applied to the AND circuit 420. It should be appreciated that the AND circuit 407 applies the content of the (IR) register 402 to the auxiliary adder 425, while the AND circuit 420 applies twice the content of the (IR) register 402 to the auxiliary adder 425. As the auxiliary adder 425 provides the sum of the output of the AND circuit 420 and the output of the AND circuit 407, the output of the auxiliary adder 425 is either zero, one, two, or three times of the content of the (IR) register 402, according to the number of pulses generated by the pulse encoder 404 during the last operational cycle $T_1$ through $T_{16}$. The output of the auxiliary adder 425 is applied to one input of the interpolation adder 408 through the output line 416, and the other input of the interpolation adder 408 receives the output of the second register (RR) 409, which has the result of the last interpolation. Accordingly, the interpolation adder 408 provides the sum of the content of the register (RR) 409, and $m$ multiple of the content of the register (IR) 402, where $m$ is 0, 1, 2, or 3. Said sum is applied to the input of the AND circuit 423 and the input of the AND circuit 410 through the output line 417. The other input of the AND circuit 423 receives the first signal ($T_1$ through $T_{11}$) from the timing signal generator 403, and the other input of the AND circuit 410 receives the second signal ($T_{12}$ through $T_{16}$) from the timing signal generator 403. Therefore, the elements less than 2047 less significant 11 digits in the sum of the interpolation adder 408 are applied to the register (RR) 409 through the AND circuit 423, and the elements larger than 2048 in the sum of the interpolation adder 408 are applied to the pulse generator 424 through the AND circuit 410; please note that $2^{11}=2048$. The pulse generator 424 applies a single interpolation pulse to the motor drive circuit 411 if the AND circuit 410 provides an output signal at the timing $T_{12}$, or two interpolation pulses if the AND circuit 410 provides an output signal at the timing $T_{13}$. If the AND circuit 410 provides the output pulses at both $T_{12}$ and $T_{13}$, then the pulse generator 424 provides three interpolation pulses. If the AND circuit 410 provides no output signal at both $T_{12}$ and $T_{13}$, the pulse generator 424 does not provide an interpolation pulse. It should be appreciated that the gate signal to the AND circuit 410 continues from $T_{12}$ to $T_{16}$, while the gate signal 215 to the AND circuit 210 in FIG. 2 is only $T_{11}$. The reason for that is that the carry from the adder 408 does not always appear at the timing $T_{11}$, but appears at the higher bit positions, since $m$ multiple of the content of the register (IR) 402 is applied to the interpolation adder 408.

Said interpolation pulses are applied to the motor 412 through the motor drive circuit 411, then the motor 412 rotates by the angle proportional to the number of the interpolation pulses applied, causing the bit 413 move in the horizontal direction, to perform the screw cutting.

Now, the operation of the present apparatus will be explained by a numerical embodiment. It is supposed that the pulse encoder 404 generated 2048 pulses for every revolution of the spindle, the pitch length of a screw is 0.5 mm, the bit 413 moves 1 μm by each interpolation pulse, and so the register (RR) 402 is provided with the value 500 from the input circuit 401.

Figure 6:
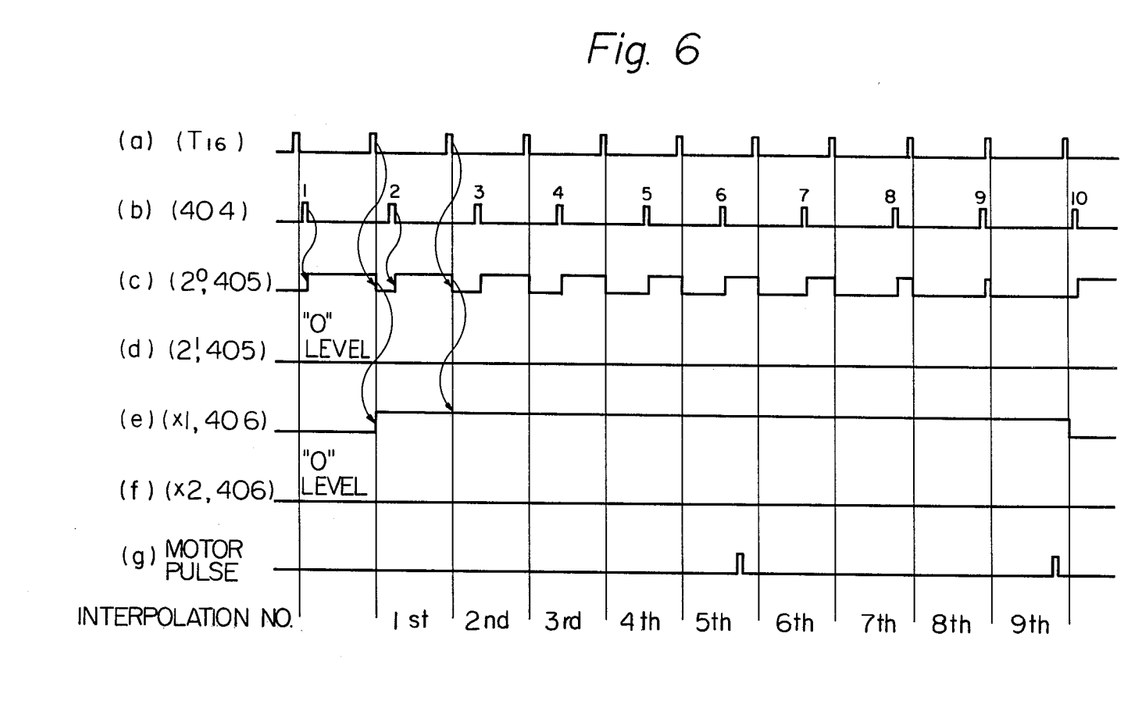
FIG. 6 is a time chart showing the operation of the apparatus in FIG. 4.

FIG. 6 shows the operation of the apparatus of FIG. 4 when the pulse period FIG. 6(b) from the pulse encoder 404 is longer than the period of $T_{16}$ (FIG. 6(a)). The bit position $2^0$ of the memory counter 405 (FIG. 6(c)) is set to one by each pulse from the pulse encoder 404 (FIG. 6(b)), and is reset to zero by the timing pulse $T_{16}$(FIG. 6(a)). While the bit position $2^1$ of the memory counter 405 (FIG. 6(d)) is always zero since only a single pulse from the pulse encoder 404 is applied to the memory counter 405 during the duration between each $T_{16}$ pulse. And it is apparent that the contents of bit positions x1 and x2 are shown in FIGS. 6(e), and 6(f), respectively. So the operation of the apparatus of FIG. 4 in the case is exactly the same as that of FIG. 2. That is to say, every time the bit position x1 of the second counter 406 provides an output signal, the content of the register (IR) 402 which is the pitch length of a screw and is 500 in the present embodiment, is added to the content of the second register (RR) 409 which holds the result of the preceeding addition by the interpolation adder 408, and the elements $T_1$-$T_{11}$ of the sum or a reminder are stored again in the second register (RR) 409, and the elements more than $T_{12}$ of the sum are applied to the motor drive circuit 411 as an interpolation pulse through the AND circuit 410, the pulse generator 424. Thus the motor 412 rotates at a predetermined angle, and the bit 413 moves by 1 μm for each interpolation pulse, cutting the screw in the work 430.

The table 1 shows the change of the registers (IR)402, and (RR)409 in each operational cycle. In the table it is supposed that the initial values of (IR) 402 and (RR) 409 are 500 and 0, respectively. It should be noted that 500 in decimal expression is 111110100 in binary expression as shown in the table. In the table 1, the content of the register (RR)409 after first, second, third and fourth interpolation cycle, is 500, 1000, 1500 and 2000, respectively. As those values do not have a digit 1 at the bit position higher than $T_{12}$ as shown in the table, the AND circuit 410 does not provide an interpolation pulse. However, in the fifth interpolation cycle, the sum from the adder 408 (=2500) has a digit at the position $T_{12}$ as shown by the circle in the table 1. Therefore the AND circuit 410 provides an interpolation pulse in the fifth cycle, then the bit 413 moves by 1 μm. The content of the register (RR) 409 is 111000100, which loses 1 at the position $T_{12}$ as shown in 5a in the table 1. The similar cycle as above continues and the table 1 shows the situation until the nineth interpolation cycle. During one revolution of the spindle, the interpolation operation is performed 2048 times, and 500 interpolation pulses are provided from the AND circuit 410. The content of the register (RR) 409 returns to zero after 2048 interpolation cycles.

Table 1

| | | Timing | $T_{16}$ | $T_{15}$ | $T_{14}$ | $T_{13}$ | $T_{12}$ | $T_{11}$ | $T_{10}$ | $T_9$ | $T_8$ | $T_7$ | $T_6$ | $T_5$ | $T_4$ | $T_3$ | $T_2$ | $T_1$ |
|---|---|---|---|---|---|---|---|---|---|---|---|---|---|---|---|---|---|---|
| | | Weight | $2^{15}$ | $2^{14}$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
| | (IR) = 500 | | 0 | 0 | 0 | 0 | 0 | 0 | 0 | 1 | 1 | 1 | 1 | 1 | 0 | 1 | 0 | 0 |
| RR (Interpolation No) | 0 (Start) | | 0 | 0 | 0 | 0 | 0 | 0 | 0 | 0 | 0 | 0 | 0 | 0 | 0 | 0 | 0 | 0 |
| | 1st (=(IR)=500) | | 0 | 0 | 0 | 0 | 0 | 0 | 0 | 1 | 1 | 1 | 1 | 1 | 0 | 1 | 0 | 0 |
| | 2nd (=2(IR)=1000) | | 0 | 0 | 0 | 0 | 0 | 1 | 1 | 1 | 1 | 1 | 0 | 1 | 0 | 0 | 0 | 0 |
| | 3rd (=3(IR)=1500) | | 0 | 0 | 0 | 0 | 0 | 1 | 0 | 1 | 1 | 1 | 0 | 1 | 1 | 1 | 0 | 0 |
| | 4th (=4(IR)=2000) | | 0 | 0 | 0 | 0 | 0 | 1 | 1 | 1 | 1 | 1 | 0 | 1 | 0 | 0 | 0 | 0 |
| | 5th | | 0 | 0 | 0 | 0 | ① | 0 | 0 | 1 | 1 | 1 | 0 | 0 | 0 | 1 | 0 | 0 |
| | | | | | | | ↓ interpolation pulse | | | | | | | | | | | |
| | 5ath | | 0 | 0 | 0 | 0 | 0 | 0 | 0 | 1 | 1 | 1 | 0 | 0 | 0 | 1 | 0 | 0 |
| | 6th (=(5a) + (IR)) | | 0 | 0 | 0 | 0 | 0 | 0 | 1 | 1 | 1 | 0 | 1 | 1 | 1 | 0 | 0 | 0 |
| | 7th (=(6) + (IR)) | | 0 | 0 | 0 | 0 | 0 | 1 | 0 | 1 | 1 | 0 | 1 | 0 | 1 | 1 | 0 | 0 |
| | 8th (=(7) + (IR)) | | 0 | 0 | 0 | 0 | 0 | 1 | 1 | 1 | 1 | 0 | 1 | 0 | 0 | 0 | 0 | 0 |
| | 9th (=(8) + (IR)) | | 0 | 0 | 0 | 0 | ① | 0 | 0 | 1 | 1 | 0 | 0 | 1 | 0 | 1 | 0 | 0 |
| | | | | | | | ↓ interpolation pulse | | | | | | | | | | | |
| | 9ath | | 0 | 0 | 0 | 0 | 0 | 0 | 0 | 1 | 1 | 0 | 0 | 1 | 0 | 1 | 0 | 0 |

Figure 7:
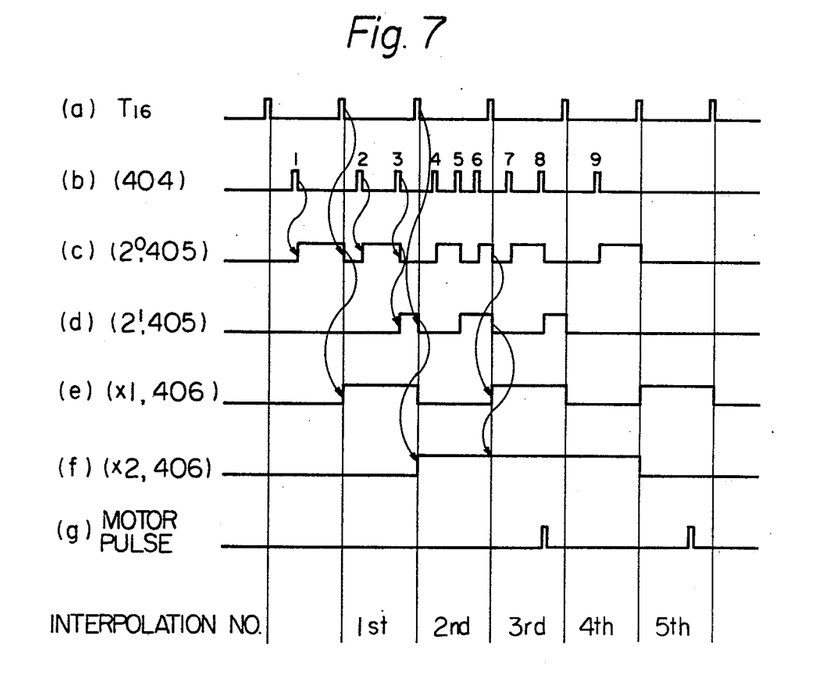
FIG. 7 is also a time chart showing the operation of the apparatus in FIG. 4.

FIG. 7 and the table 2 show the operation of the apparatus of FIG. 4 when a plurality of pulses are generated by the pulse encoder 404 during a single interpolation cycle $T_1$-$T_{16}$.

In this case, the memory counter 405 stores the pulses from the pulse encoder 404 during each interpolation cycle $T_1$-$T_{16}$, and transfers the content of the same to the second counter 406, as explained before. The second counter 406 controls the AND circuits 407 and 420 to control the value applied to the interpolation adder 408 from the auxiliary adder 425. In the present embodiment since the content of the register (IR) 402 is 500, so the value applied to the interpolation adder 408 is one of $0(=500\times0)$, $500(=500\times1)$, $1000(=500\times2)$, or $1500(=500\times3)$. Thus, the interpolation adder 408 provides the sum of the $m$ multiple of (IR) and (RR). In FIG. 7 and the table 2, in the first interpolation cycle, only a single pulse (1) (see FIG. 7(b)) is generated by the pulse encoder 404 in the last interpolation cycle, so the content of (IR) 402 and the content of (RR) 409 are added $(=0=500)$, and the sum $(=500)$ is again stored in (RR) 409. However, in the second interpolation cycle, two pulses ((2) and (3)) are stored in the memory counter 405, so two times (IR) $(=2\times500)$ and (RR) $(=500)$ are added and the sum $(=1500)$ is stored in (RR) 409. In the third interpolation cycle, three pulses ((4), (5) and (6)) are stored in the memory counter 405, thus three times (IR) $(=3\times500)$ and (RR) $(=1500)$ are added. In this case the sum $(=3000)$ has a digit at the position $T_{12}$ so an interpolation pulse is generated (see FIG. 7(g)). The cycles continue and at the end of the fifth cycle, two interpolation pulses are generated. It should be appreciated that after two interpolation pulses are generated (the nineth cycle in FIG. 6 and the fifth cycle in FIG. 7), the content of the register (RR) 409 is exactly the same in tables 1 and 2, said content is 110010100 $(=404)$.

vides the equivalent performance of a high speed switching element.

Many modifications of the above embodiments are of course possible to those skilled in the art. For instance, the memory counter 405 and the second counter 406 can have more than two bit positions to improve the substantial operational speed of the apparatus, and the present apparatus can be applied not only to screw cutting but also to other applications in which a pulse encoder 404 might be replaced by an oscillator.

From the foregoing it will now be apparent that a new and improved high speed pulse interpolator has been found. It should be understood of course that the embodiments disclosed are merely illustrative and are not intended to limit the scope of invention. Reference should be made to the appended claims, therefore, rather than the specification as indicating the scope of the invention.

Finally, the major reference numerals in the specification are listed below.

103:—bit 130:—work
200,400:—instruction tape
201,401:—input circuit
202,402:—first register (integrand register (IR))
203,403:—timing signal generator
204,404:—pulse encoder
205:—flip-flop
206:—flip-flop
405:—memory counter
406:—second counter
207,407:—AND circuit
208,408:—interpolation adder
209,409:—second register (reminder register (RR))
210,410:—AND circuit
211,411:—motor drive circuit
212,412:—motor
213,413:—bit Table 2

| | | Timing | $T_{16}$ | $kT_{15}$ | $T_{14}$ | $T_{13}$ | $T_{12}$ | $T_{11}$ | $T_{10}$ | $T_9$ | $T_8$ | $T_7$ | $T_6$ | $T_5$ | $T_4$ | $T_3$ | $T_2$ | $T_1$ |
|---|---|---|---|---|---|---|---|---|---|---|---|---|---|---|---|---|---|---|
| | | Weight | $2^{15}$ | $2^{14}$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
| | (IR) = 500 | | 0 | 0 | 0 | 0 | 0 | 0 | 0 | 1 | 1 | 1 | 1 | 0 | 1 | 0 | 0 |
| R R | O (Start) | | 0 | 0 | 0 | 0 | 0 | 0 | 0 | 0 | 0 | 0 | 0 | 0 | 0 | 0 | 0 |
| (Inter- | 1st (=(IR)=500) | | 0 | 0 | 0 | 0 | 0 | 0 | 0 | 1 | 1 | 1 | 1 | 1 | 0 | 1 | 0 | 0 |
| pola- | 2nd (=(1) + 2(IR)=1500) | | 0 | 0 | 0 | 0 | 0 | 1 | 0 | 1 | 1 | 1 | 0 | 1 | 1 | 1 | 0 | 0 |
| tion | 3nd (=(2) + 3(IR)=3000) | | 0) | 0 | 0 | 0 | ① | 0 | 1 | 1 | 1 | 0 | 1 | 1 | 1 | 0 | 0 | 0 |
| No) | | | | | | | ↓ | | | | | | | | | | | |
| | | | | | | | interpolation pulse | | | | | | | | | | | |
| | 3ath | | 0 | 0 | 0 | 0 | 0 | 0 | 1 | 1 | 1 | 0 | 1 | 1 | 1 | 0 | 0 | 0 |
| | 4th (=(3a) + 2(IR)) | | 0 | 0 | 0 | 0 | 0 | 1 | 1 | 1 | 1 | 0 | 1 | 0 | 0 | 0 | 0 | 0 |
| | rth (=(4) + (IR)) | | 0 | 0 | 0 | 0 | ① | 0 | 0 | 1 | 1 | 0 | 0 | 1 | 0 | 1 | 0 | 0 |
| | | | | | | | ↓ | | | | | | | | | | | |
| | | | | | | | interpolation pulse | | | | | | | | | | | |
| | 5ath | | 0 | 0 | 0 | 0 | 0 | 0 | 0 | 1 | 1 | 0 | 0 | 1 | 0 | 1 | 0 | 0 |

Thus it should be understood that the apparatus in FIG. 4 can operate correctly even when more than two pulses are generated by the pulse encoder 404 during a single interpolation cycle, although the apparatus in FIG. 2 loses the second pulse and can not operate correctly in the same situation.

Lately, the revolutional speed of the spindle of an N.C. is apt to be increased for higher productivity. In order to accommodate the high revolutional speed of a spindle, a prior art would have to utilize expensive switching elements which could operate at higher speed. According to the present invention, conventional low speed switching elements can be utilized just by introducing a small amount of additional circuitry, like an auxiliary adder and second counter, which pro- 217:—output line
218:—carry line
301:—output terminal
419:—1 bit delay
421:—first signal output line
422:—second signal output line
424:—pulse generator
425:—auxiliary adder
430:—work

What is claimed is:

1. A high speed interpolation system comprising a first register having a predetermined value, a second register for storing a temporary value, an auxiliary adder for obtaining $m$ multiple of the contents of said first register, an interpolation adder for obtaining the sum of the contents of said first register and an output of said auxiliary adder and applying the reminder of the sum of the addition to said second register with the carry of the addition producing an output interpolation pulse, means responsive to said interpolation pulse for operating through an interpolation cycle, and a memory counter coupled to said responsive means having more than two bit positions for counting a number of input instruction pulses in each interpolation cycle, a second counter for receiving the contents of said memory counter and for providing a value $m$ to said auxiliary adder.

2. The invention as defined in claim 1 wherein said first register and second register are shift registers, the content of which is always circulating in the same direction according to timing pulses.

3. The invention as defined in claim 1 wherein said memory counter and said second counter have 2 bit positions.

4. The invention as defined as claim 1 wherein said first and second registers have 16 bit positions.

5. The invention as defined in claim 1 wherein said input instruction pulses are obtained from the revolution of the spindle of a screw cutting device, and said output interpolation pulse works for moving a bit of said device parallel to the axis of the spindle.

* * * * *